(12) United States Patent
Schonhorst et al.

(10) Patent No.: US 7,506,914 B2
(45) Date of Patent: Mar. 24, 2009

(54) CONVERTIBLE VEHICLE (75) Inventors: Heiko Schonhorst, Westerkappeln (DE);
Thorsten Wietheger, Bad Essen (DE);
Klaus Licher, Georgsmarienhütte (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/577,030

(22) PCT Filed: Oct. 12, 2004

(86) PCT No.: PCT/DE2004/002260

§ 371 (c)(1),
(2), (4) Date: Jan. 16, 2007

(87) PCT Pub. No.: WO2005/039905

PCT Pub. Date: May 6, 2005

(65) Prior Publication Data
US 2007/0138827 A1 Jun. 21, 2007

(30) Foreign Application Priority Data
Oct. 25, 2003 (DE) .................. 103 49 848

(51) Int. Cl.
*B60J 7/12* (2006.01)

(52) U.S. Cl. .............................. 296/107.04; 296/107.12

(58) Field of Classification Search ............ 296/107.12, 296/107.04
See application file for complete search history.

(56) References Cited

U.S. PATENT DOCUMENTS

| 3,053,567 | A | * | 9/1962 | Geiger | 296/107.08 |
| 3,075,804 | A | * | 1/1963 | Geiger et al. | 296/107.12 |
| 5,002,330 | A | * | 3/1991 | Koppenstein et al. | 296/107.12 |
| 6,328,372 | B1 | * | 12/2001 | Just | 296/107.12 |

* cited by examiner

*Primary Examiner*—Dennis H Pedder
(74) *Attorney, Agent, or Firm*—Friedrich Kueffner (57) ABSTRACT

The invention relates to a convertible vehicle (1) having a movable roof (2), which has a flexible cover (4) at least in its back area (6), said cover being held in a tensioning bracket (8) in the back area thereof, which can be displaced upwards from a tensioned position forming the closed roof (2). The convertible vehicle is configured in such a way that at least one folding device (13) acting upon a border area of the cover (4) that is located beneath and in front of the tensioning bracket (8) in driving direction (F) of the cover (4) is assigned to said cover (4), said folding device exerting a constraining folding force upon said border area when the roof is being opened (2).

8 Claims, 8 Drawing Sheets

CONVERTIBLE VEHICLE

The invention concerns a convertible vehicle with a movable roof, which has a flexible roof covering at least in its rear area, in accordance with the introductory clause of claim 1.

A convertible vehicle with a completely or partially flexible roof covering, e.g., a vinyl or textile roof covering, often has, provided that the rear end region of the roof covering is not secured to the vehicle body, a rear tension bow, to which the roof covering is connected and by which the roof covering can be stretched on a body section on which it rests when the roof is closed. In this regard, it is well known that the tension bow is U-shaped as viewed from above and has a middle section that extends transversely to the vehicle and two lateral legs that extend essentially in the longitudinal direction of the vehicle and point in the direction of vehicle travel. To allow mobility, for example, rotatability, of the tension bow for opening or closing the roof, it is necessary for a section of the roof covering located in front of the lateral legs of the tension bow with respect to the direction of vehicle travel to be elastically movable and especially foldable during the opening of the tension bow. Therefore, the lateral legs of the tension bow cannot be permanently connected to the roof covering all the way to, say, the pivot axis of the tension bow; rather, there must also be a free section where the covering material is "slack", to allow the easy and elastic movement of this section of the roof covering. Nevertheless, when the roof is closed, this material slack must rest securely and with a good seal on the automobile body.

The objective of the invention is to improve a convertible vehicle of the aforementioned type with respect to the lateral regions of a flexible roof covering that are not secured to rigid parts.

The invention achieves this objective with a convertible vehicle with the features of Claim 1. Advantageous refinements of the object of the invention are described in dependent Claims 2 to 8.

The invention ensures well-defined and always uniform folding of the material slack during movement of the roof. The seal located in this region, which rests with a good seal on a section of the automobile body when the roof is closed, can be immediately forced to fold in when the roof begins to open and thus does not rub over the section of the automobile body. The service life of the seal and of the lower marginal region of the roof covering that faces the automobile body, which marginal region is also raised, is thus considerably prolonged. Wear of the body section, which, e.g., may be painted, is also prevented. The well-defined folding also ensures that the roof covering material does not experience a large number of different folding lines and thus also has an increased service life.

If exactly one folding device is assigned to each longitudinal side of the vehicle, an expensive synchronization device for the two sides of the vehicle is unnecessary.

If the roof also has a tensioning device that presses the sealing line of the material slack against a support of the automobile body when the roof is closed, the sealing contact of the roof on the automobile body when the roof is closed is improved. In addition, wearing out of the sealing line by the folding movement is reliably prevented.

A simple design of a folding device provides for a traction cable with a spring element on each side of the vehicle. In this regard, a polyamide cable does not cut in as much as a steel cable and therefore offers the possibility of using light plastic guides and/or deflecting devices with relatively small deflection radii.

The traction cable can extend, for example, over a large region of the sideline of the roof from a roof tip, which lies against the windshield frame when the roof is closed, to the rear tension bow. As soon as the roof tip starts to rise, the seal and the material slack also start to fold without further control or drive elements, so that the seal is lifted very early from the body section, which is in accord with the desired reduction of wear.

Further advantages and features of the invention are explained below with reference to the specific embodiment of the object of the invention that is illustrated in the drawings.

Figure 1:
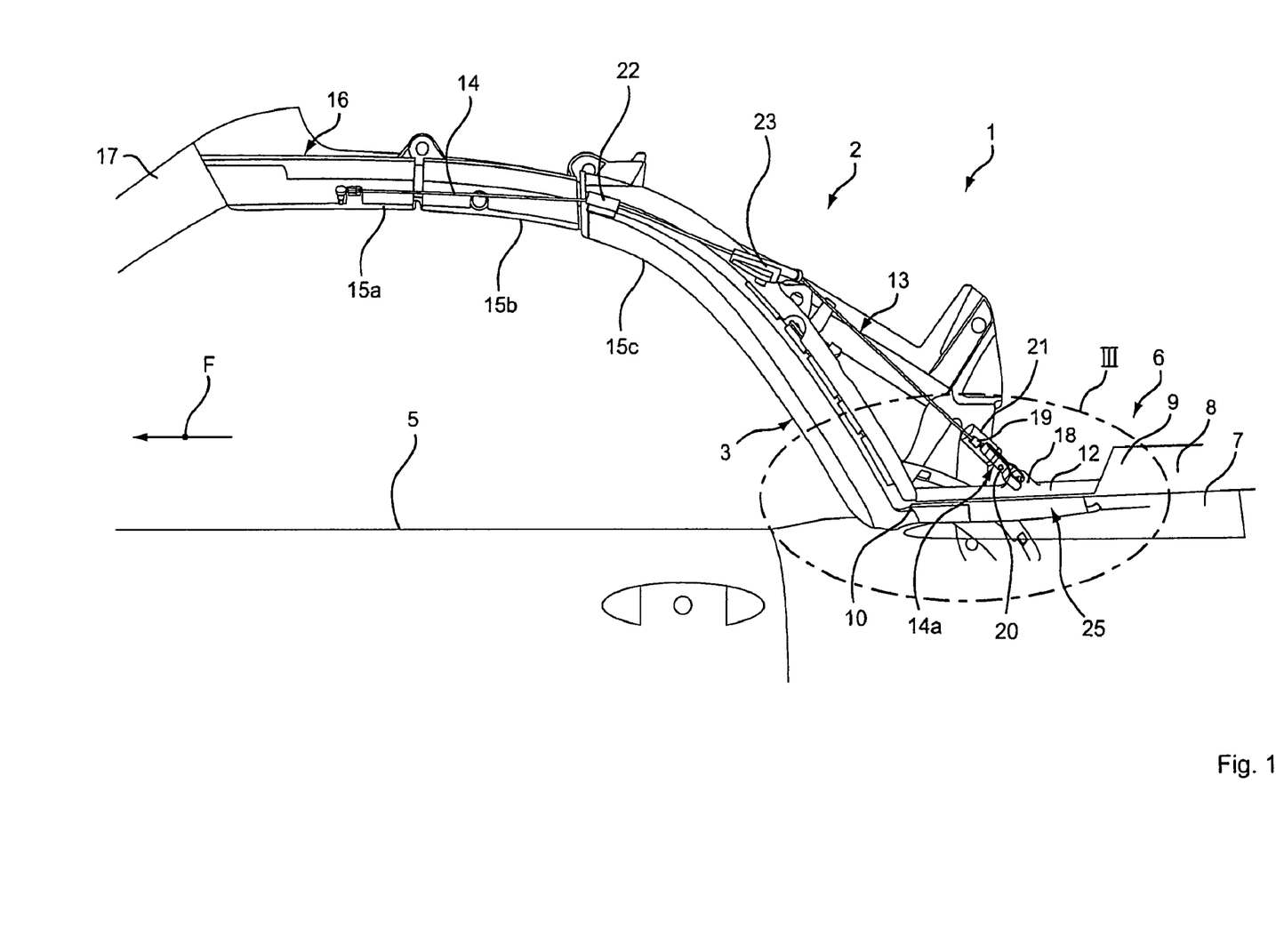
FIG. 1 shows a schematic side view of an upper region of a convertible vehicle of the invention with the roof closed, shown without the roof covering for the sake of clarity.
Figure 2:
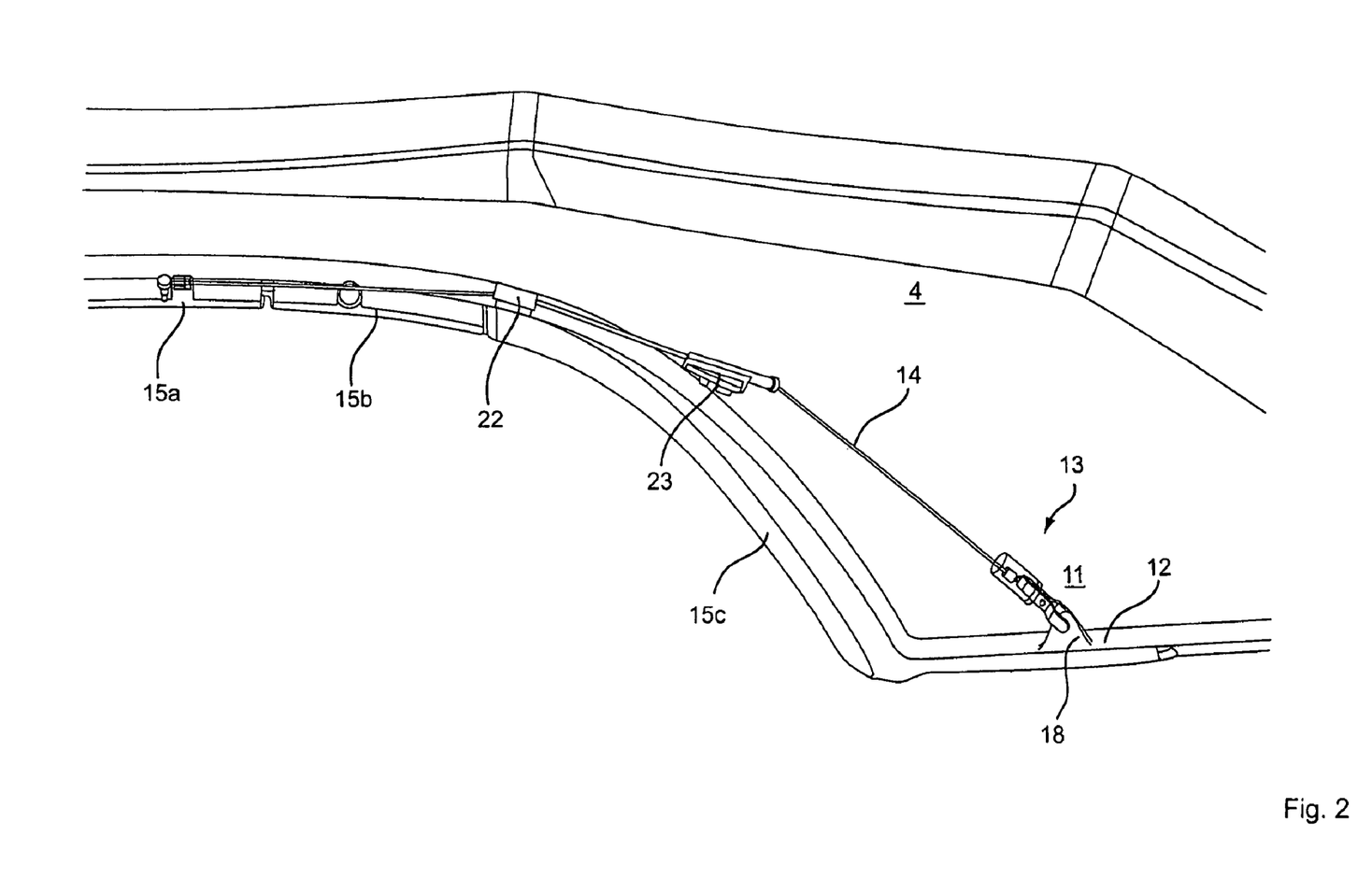
FIG. 2 shows a view similar to that of FIG. 1 but with the roof covering shown.
Figure 3:
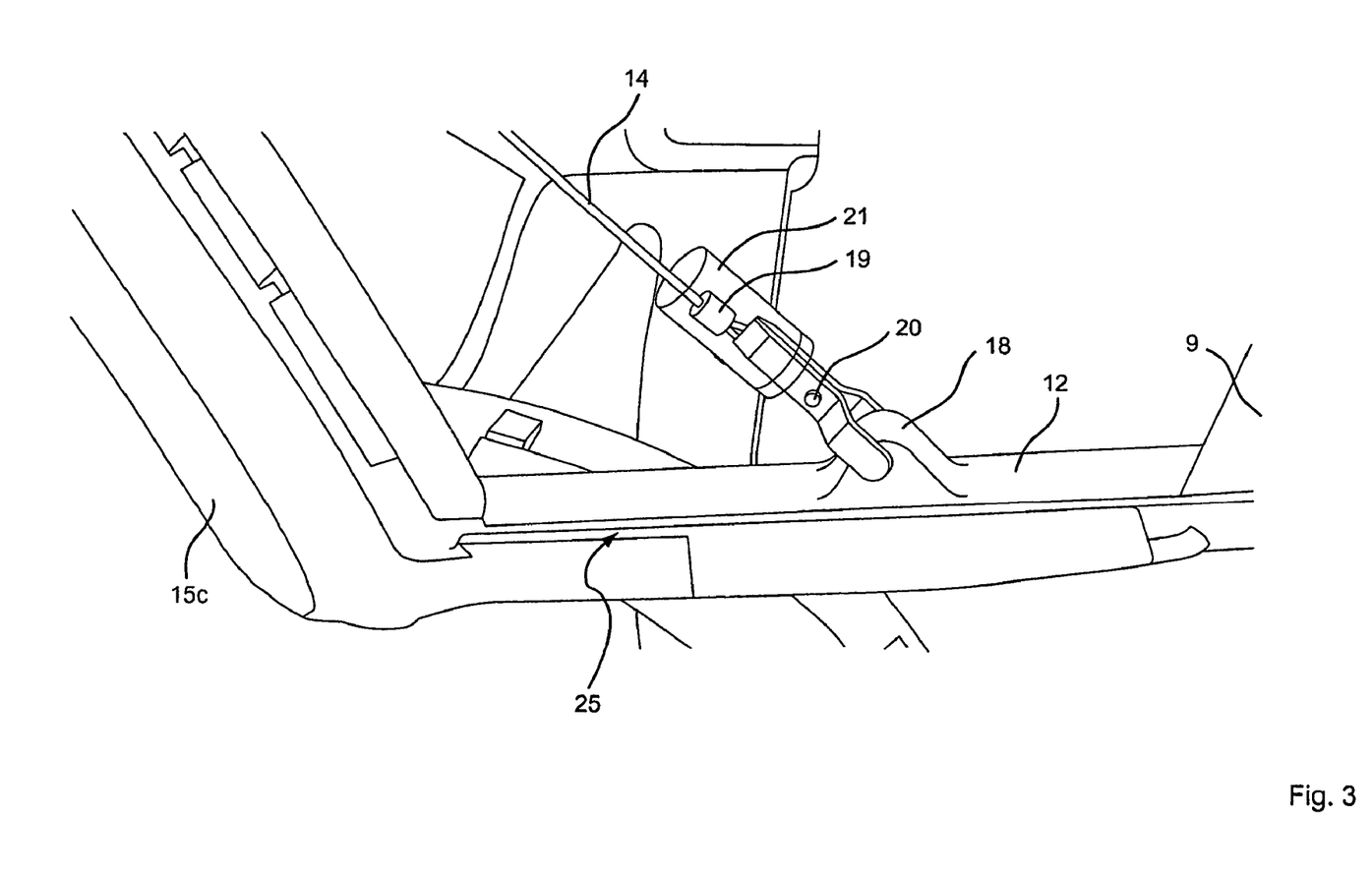
FIG. 3 shows the detail III in FIG. 1.
Figure 4:
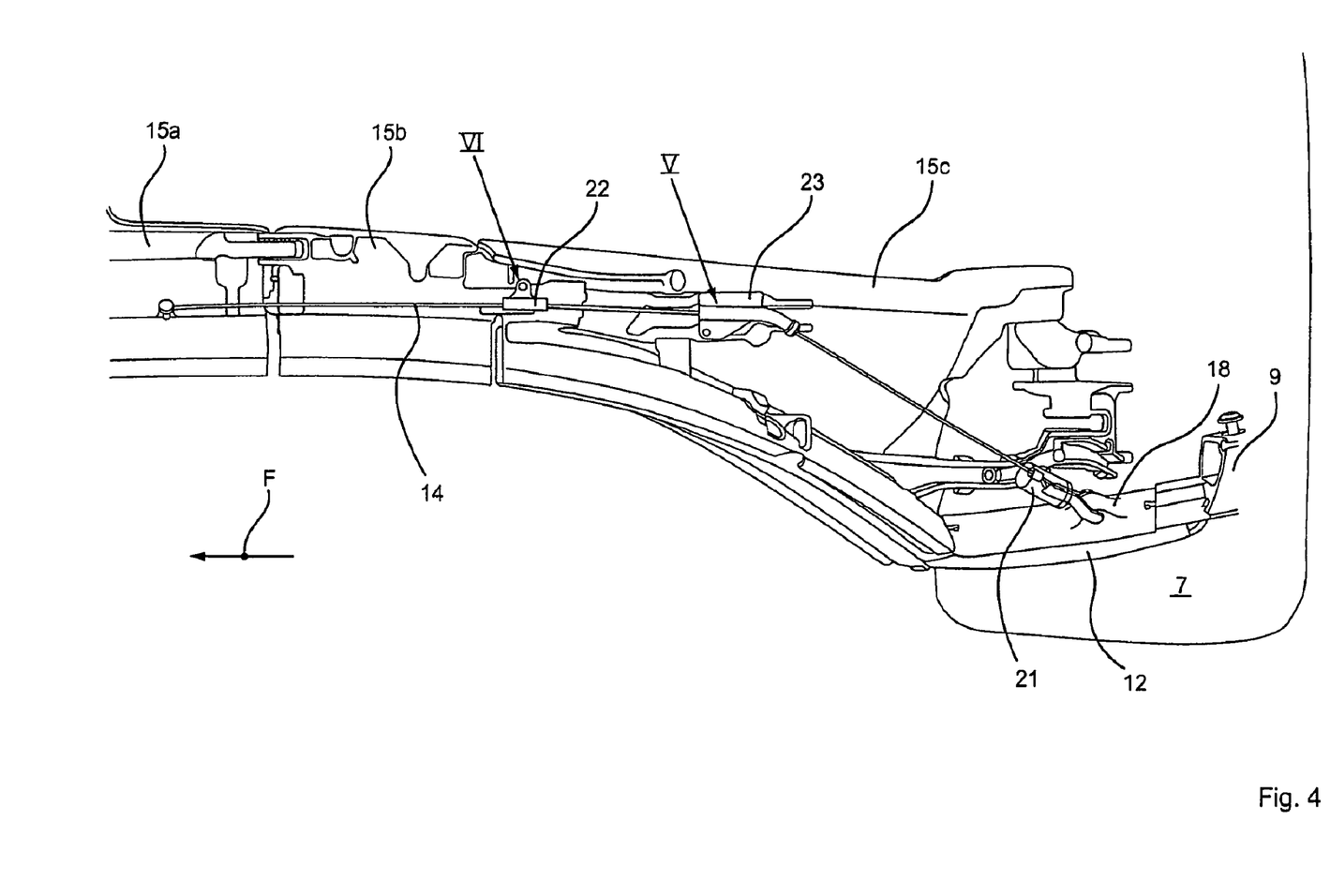
FIG. 4 shows a top view of a lateral roof frame region according to FIG. 1, again without the roof covering.
Figure 5:
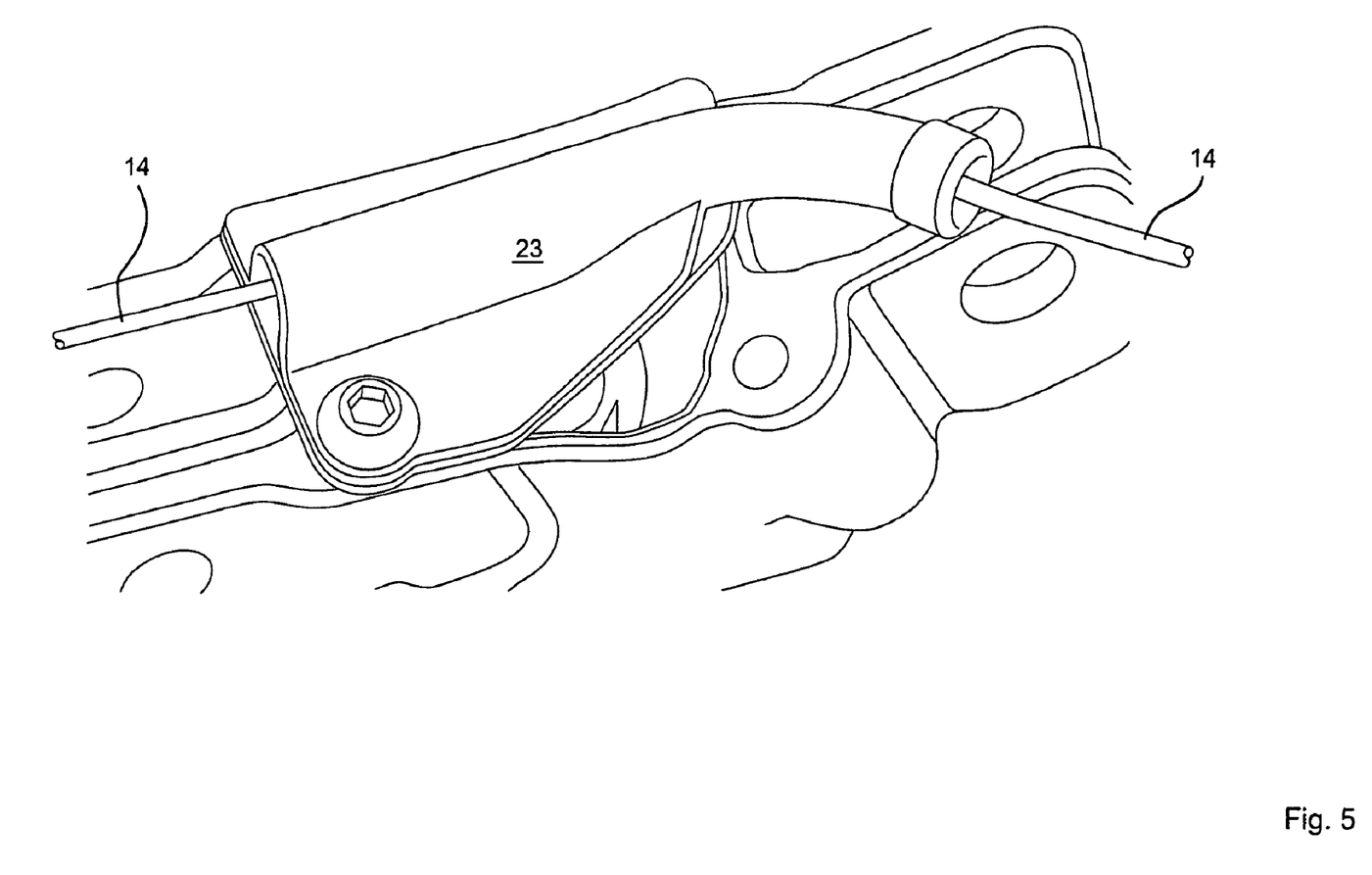
FIG. 5 shows a detail view of a deflecting device for the traction cable of the folding device, corresponding approximately to a view from the direction of arrow V in FIG. 4.
Figure 6:
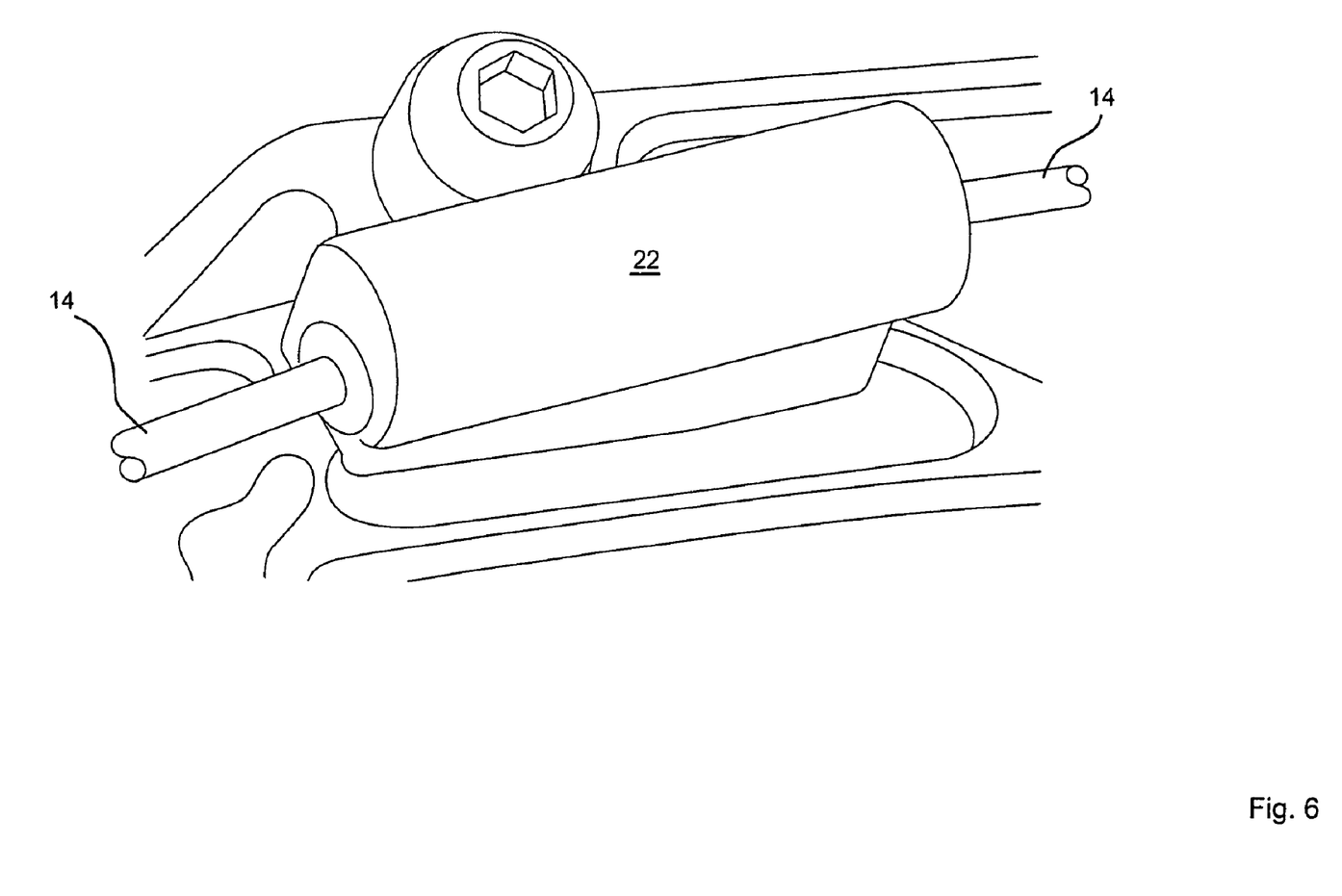
FIG. 6 shows a detail view of a guide for the traction cable of the folding device, corresponding approximately to a view from the direction of arrow VI in FIG. 4.

The convertible vehicle 1, only the upper region of which is shown schematically in FIG. 1, has a movable roof 2, which has a movable linkage that is labeled here as a whole with reference number 3. The movable linkage 3 is completely covered by a roof covering 4 (shown only in FIG. 2; not shown in FIG. 1). Alternatively, it is also possible to provide a flexible roof covering only in the rear section of the roof 2, and for the front section of the roof 2 with respect to the direction of vehicle travel F to have one or more rigid outer skin sections. As the roof 2 is being opened, it is stowed in its entirety in the automobile body 5.

In the illustrated embodiment, in the closed state of the roof 2, the rear section 6 of the roof 2 rests on an openable cover part 7 of the automobile body 5.

In this region 6, the roof linkage 3 includes a rear tension bow 8, which is horizontally situated when the roof 2 is closed and in this position rests on the cover part 7. The roof covering 4 is connected to the tension bow 8. The tension bow 8 is U-shaped as viewed from above and comprises a middle section, that extends transversely with respect to the vehicle 1, and lateral legs 9 that extend essentially in the direction of vehicle travel F. The tension bow 8 can be swung upward about a fixed horizontal axis 10 or about a horizontal axis 10 that can move with another part of the linkage 3 (here a rear lateral frame part 15c) out of the tensioned position illustrated in FIG. 1, in which the roof covering 4 is tensioned by the lowered tension bow 8, into a position in which the tension on the roof covering 4 is released. During this upward rotational movement, the tension bow 8 is raised from the cover part 7, so that the cover part 7 can then open.

In front of the lateral legs 9 with respect to the direction of vehicle travel F, there is a region 11 of the roof covering 4 that is not connected to rigid parts, the so-called material slack, the lower edge of which forms a sealing line 12 that extends each lateral leg 9 towards the front with respect to the direction of vehicle travel F, e.g., by means of a rubber elastic hollow section on each longitudinal side of the vehicle. When the roof is closed (FIG. 1, FIG. 2), this is intended to produce tight contact between this region 11 of the roof covering 4 and the section of the automobile body 5 on which it rests, for example, the cover part 7. The region 11 that extends freely at its lower edge without support by the tension bow can be a few centimeters to a few tens of centimeters long and can be elastically deformed and folded in, to a greater or lesser extent, to open the roof 2.

In accordance with the invention, at least one folding device 13 is provided for well-defined, always uniform folding of the region 11 and sealing line 12. Exactly one folding device 13 is constructed here on each longitudinal side of the vehicle. In the illustrated embodiment, each folding device 13 comprises at least one traction cable 14. This cable can be made of steel or especially of a plastic that cuts in less than steel, e.g., polyamide. The rear end of the cable 14 with respect to the direction of vehicle travel F is articulated with the seal 12 in the region of the material slack 11, and the front end of the cable 14 is articulated with a front lateral frame part 15a, which is rigidly connected with the roof top 16. In the closed position of the roof 2, the roof top 16 (FIG. 1) is locked on a front windshield frame 17.

Instead of the cable 14, other devices could also be provided to force the folding of the material slack 11, e.g., a spring inserted in the sealing line 12 and pretensioned in the direction of folding or a separate, small driving mechanism that can partially raise the seal 12.

A bearing eye 18, on which the traction cable 14 or a drive element acts, can be injection-molded on the seal 12. To this end, in the illustrated embodiment, the end of the traction cable 14 is laid as a loop, which is secured with a ring clamp 19. The loop can then fit around a bolt 20. The entire region of the articulation of the traction cable 14 can be secured by a protective sleeve 21, which can consist, e.g., of a thin, rubber elastic material. This prevents the material of the roof covering 4 from rubbing against parts with sharp edges.

In the present embodiment, the frame 3 of the roof 2 comprises three lateral frame parts 15a, 15b, 15c arranged one behind the other on each side of the vehicle when the roof 2 is closed. The front frame part 15a is rigidly connected to a transverse strut and is thus part of the so-called roof tip 16. The front end of the traction cable 14 is connected to this frame part 15a. The cable 14 extends from there, for example, through a guide 22 and a deflecting device 23, which, when a polyamide cable 14 is used, can also be made of a plastic, to the seal 12 of the material slack 11 and is attached to the seal 12 as described above.

To compensate tolerances and to provide tension that is always adequate, the folding device 13 can additionally include at least one tension spring 14a.

Figure 7:
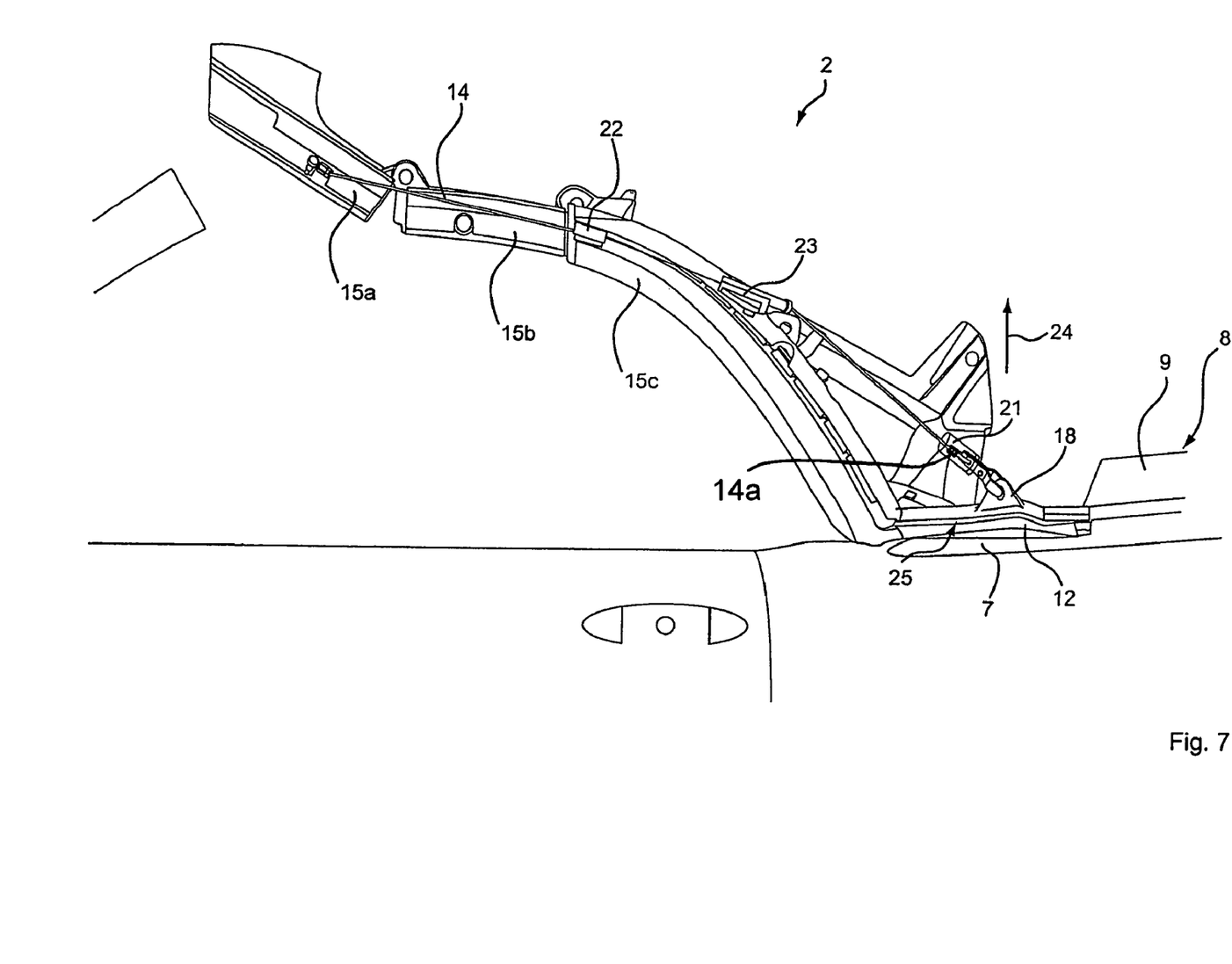
FIG. 7 shows a view similar to that of FIG. 1 but during the opening of the roof with the roof tip raised.
Figure 8:
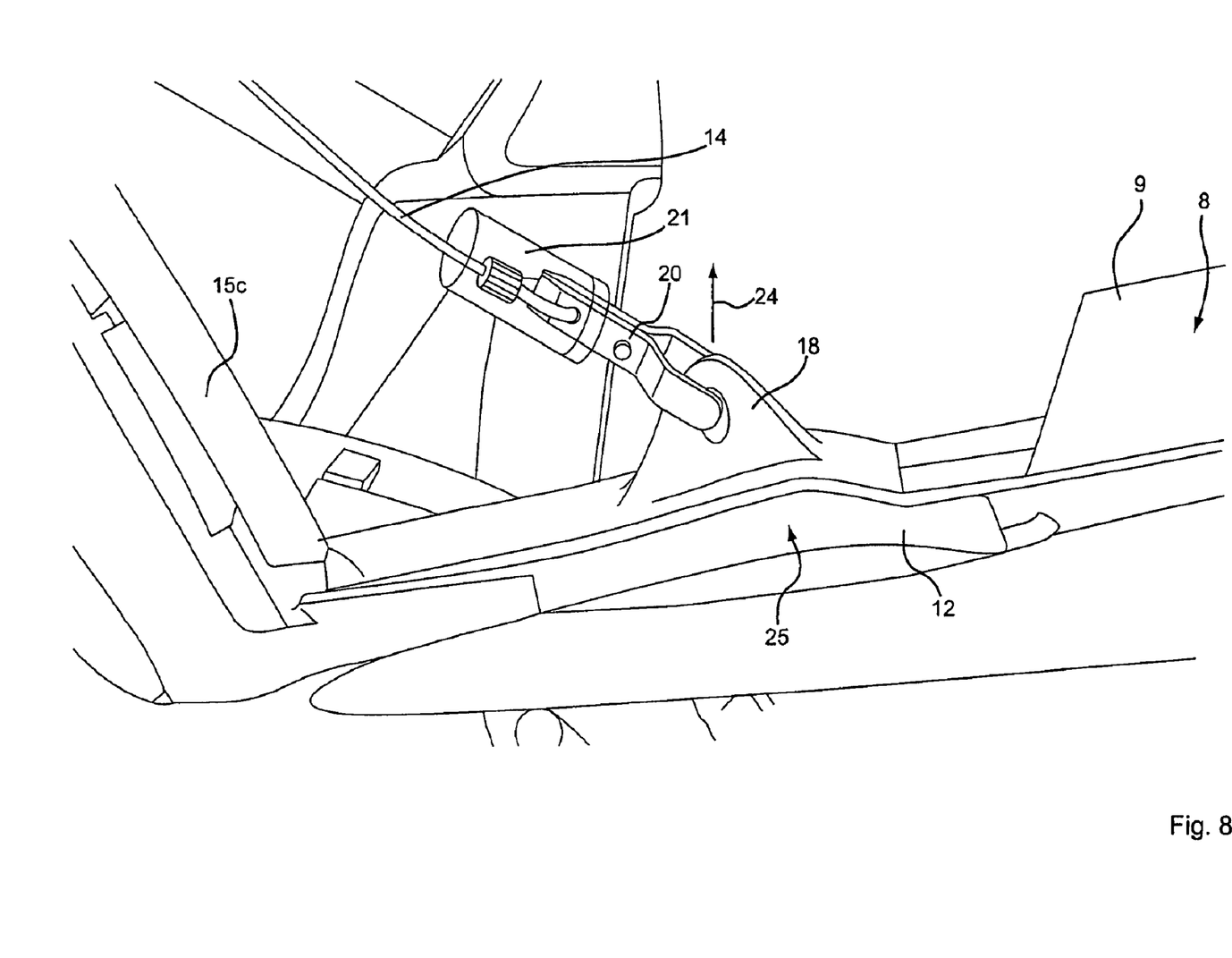
FIG. 8 shows a view similar to that of FIG. 3 but during the opening of the roof.

When the roof tip 16a is raised (FIG. 7, FIG. 8), tension is placed on the front end of the traction cable 14, which thus pulls the seal 12 upward in a well-defined way in the direction of arrow 24. This immediately causes the seal 12 to be easily lifted from its support on the cover part 7 or other part of the automobile body 5. In this regard, it is also possible to provide several articulations of the traction cable 14 or the like on the seal 12, so that the seal 12 does not primarily fold—as shown here—but rather is lifted as a whole from the automobile body 5.

In the opposite direction, when the roof is being closed, it is only in the last phase of the closing of the roof, namely, when the roof top 16 is being lowered, that the tension on the traction cable 14 is released to such an extent that the seal 12 of the material slack 11 drops down on the automobile body 5 to form a completely tight seal. This movement also proceeds in a well-defined way that is always the same, so that here too friction of the moving seal over the automobile body 5 is prevented.

In an advantageous refinement, the roof 2 can additionally include a tensioning device 25, which is likewise assigned to the sealing line 12 but does not improve its opening or closing movement but rather its contact with the automobile body 5 when the roof 2 is closed. The tensioning device 25 causes the seal 12 to exert a force that acts in the direction of arrow 24 on the sealing line 12 and presses it into a tightly tensioned position on the automobile body 5. In particular, this action can be supported by providing the automobile body 5 with a support surface that projects slightly concavely upward. This also assists the bending of the seal 12 that acts in the direction of arrow 24 when the roof top 16 is being raised.

Otherwise, however, the tensioning device 25 works in the opposite direction from the folding device 13. The tensioning device 25 can comprise, for example, a leaf spring positioned in the seal 12 that just counteracts the folding of the seal 12. The placement of the tensioning device 25 at least partially within the seal 12 provides for an arrangement that is protected against external wear. The linear application of pressure on the seal 12 can be assured especially well. It is also possible for both the tensioning device 25 and the folding device 13 to be situated in the seal 12.

During the lifting of the roof tip 16, when the traction cable 14 of the folding device 13 is tightened, the tensioning device 25 can relax, so that the material slack 11 can fold in with the seal 12 in the manner described above. To make this possible, the traction cable 14 can, for example, act in opposition to the spring force of the tensioning device 25 or move a spring with a joint past a neutral point into a relaxed position.

It goes without saying that the folding device 13 can be installed in the vehicle 1 even without a tensioning device 25.

The invention claimed is:

1. Convertible vehicle (1) with a movable roof (2), which has a flexible roof covering (4) at least in its rear area, wherein the rear of the roof covering (4) is held on a tension bow (11), which can be moved upward from a tensioned position that forms the closed roof (2), wherein at least one externally acting folding device (13), which acts on lower marginal regions of the roof covering (4) that are located in front of the tension bow (8) with respect to the direction of vehicle travel (F), and generates a tension force with a vertically upwardly directed component for lifting the covering from the tension bow, is assigned to the roof covering (4) and exerts a force on these marginal regions that forces the regions to fold in during the opening of the roof (2).

2. Convertible vehicle in accordance with claim 1, wherein exactly one folding device (13) is assigned to each longitudinal side of the vehicle.

3. Convertible vehicle in accordance with claim 1, wherein the at least one folding device (13) extends between a front region of the roof, a so-called roof top (16), and the rear tension bow (8).

4. Convertible vehicle in accordance with claim 1, the at least one folding device (13) includes a traction cable (14), by means of which the folding device (13) engages the section of the sealing line (12).

5. Convertible vehicle in accordance with claim 4, wherein the traction cable (14) consists of polyamide.

6. Convertible vehicle in accordance with claim 1, wherein the at least one folding device (13) includes a tension spring (14a).

7. Convertible vehicle in accordance claim 1, wherein the roof (2) includes at least one tensioning device (25), which is assigned to a sealing line (12) situated in the lower marginal region of the roof covering (4), acts in its tensioned position on the sealing line (12) with a force that presses on a region of the automobile body (5) that serves as a support, and can be relaxed in a well-defined direction by the folding device (13).

8. Convertible vehicle in accordance with claim 1, further comprising a body-mounted cover part (7), on which, in the closed position, the rear end (6) of the roof tightly rests, and which is to be opened to receive the roof (2) in the automobile body (5).

* * * * *